(12) United States Patent
Muhs

(10) Patent No.: US 8,347,705 B2
(45) Date of Patent: Jan. 8, 2013

(54) MAGNETICALLY MOUNTED LIGHT FOR USE IN INSPECTING STEEL BELTED TIRES

(76) Inventor: Charles Muhs, Newcomerstown, OH (US)

(\*) Notice: Subject to any disclaimer, the term of this patent is extended or adjusted under 35 U.S.C. 154(b) by 530 days.

(21) Appl. No.: 12/693,185

(22) Filed: Jan. 25, 2010

(65) Prior Publication Data

US 2010/0188862 A1 Jul. 29, 2010

Related U.S. Application Data

(60) Provisional application No. 61/205,945, filed on Jan. 26, 2009.

(51) Int. Cl.
*B60C 23/02* (2006.01)
(52) U.S. Cl. ..................... 73/146.5
(58) Field of Classification Search .......... 73/146–146.8
See application file for complete search history.

(56) References Cited

U.S. PATENT DOCUMENTS

| 3,970,837 A | 7/1976 | Helm |
| 4,564,894 A | 1/1986 | Gonzalez |
| 4,918,976 A * | 4/1990 | Fogal, Sr. ............... 73/40.7 |
| 4,965,708 A | 10/1990 | Louis |
| 4,969,350 A * | 11/1990 | Fogal, Sr. ............... 73/40.7 |
| 5,130,899 A | 7/1992 | Larkin et al. |
| 6,951,409 B2 | 10/2005 | Hsien |
| 7,187,261 B2 | 3/2007 | Cassar |
| 7,343,789 B2 * | 3/2008 | Fujisawa et al. ........... 73/146 |
| 7,882,732 B2 * | 2/2011 | Haralampu et al. ........ 73/146.5 |
| 2011/0239753 A1 * | 10/2011 | Shannon .................. 73/146.8 |

\* cited by examiner

*Primary Examiner* — Andre Allen
(74) *Attorney, Agent, or Firm* — Sand & Sebolt

(57) ABSTRACT

The invention includes a light assembly which is configured to magnetically mount on a steel belted tire and a method of inspecting the inside of the tire using the light assembly.

20 Claims, 12 Drawing Sheets

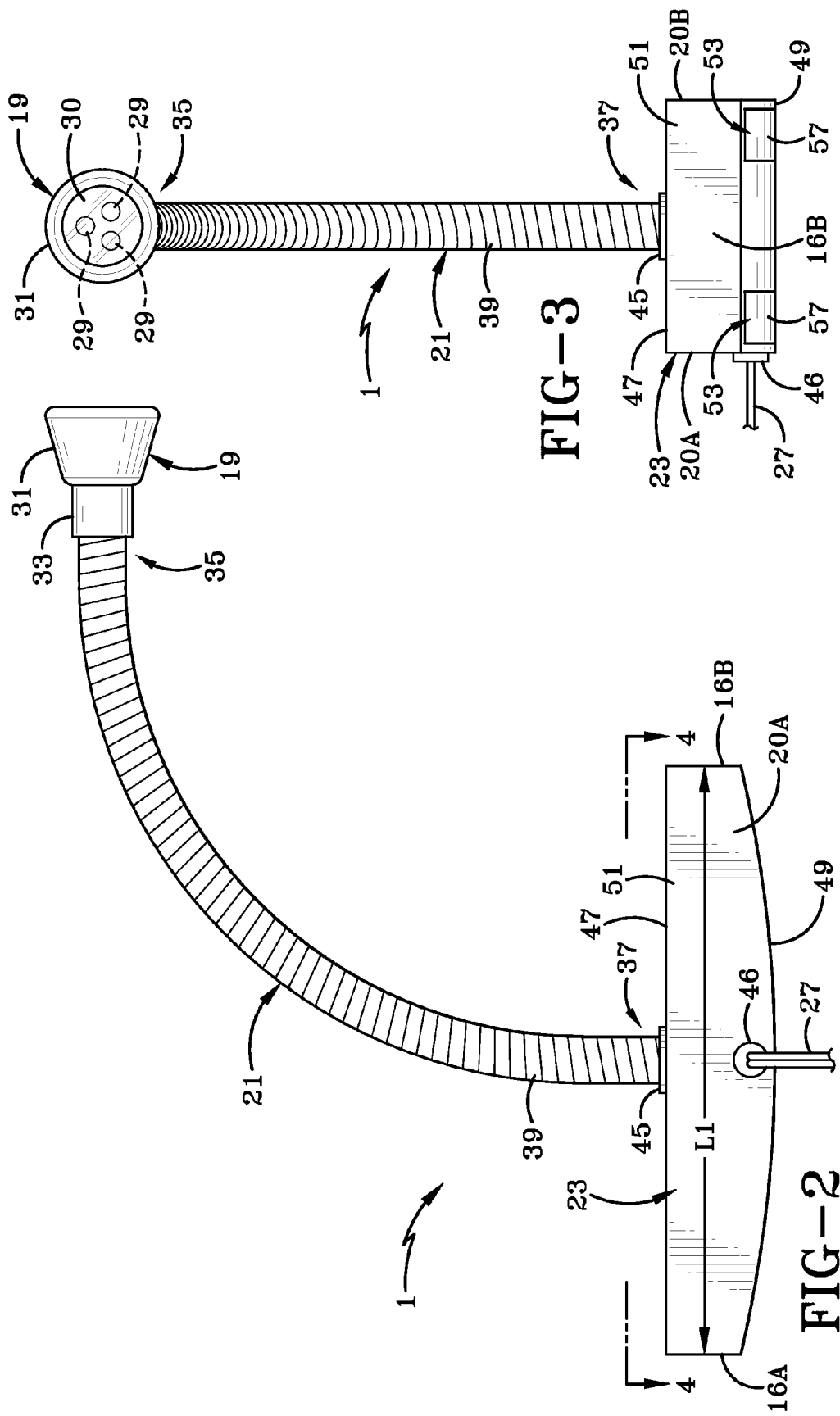

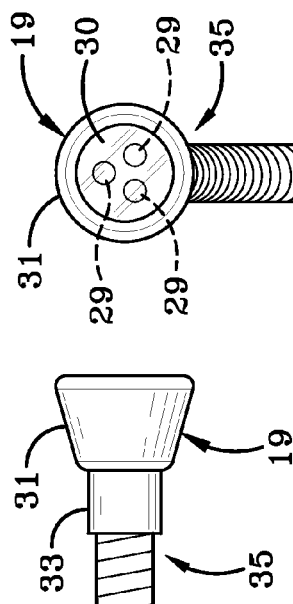
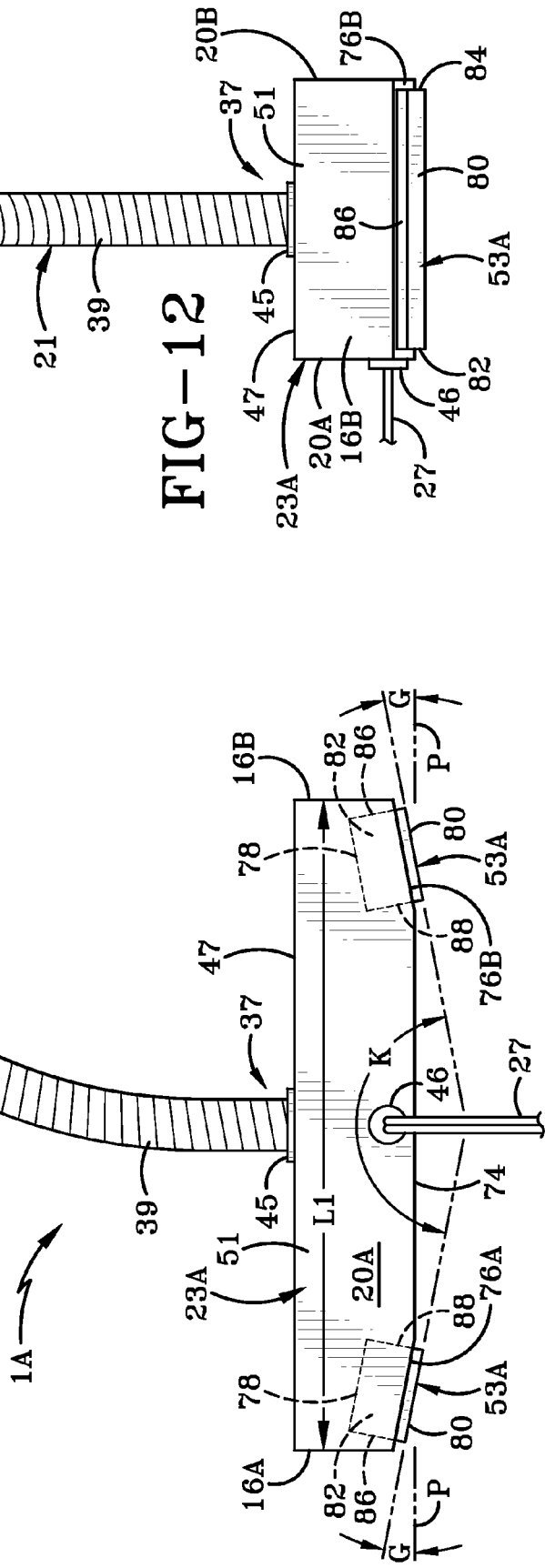

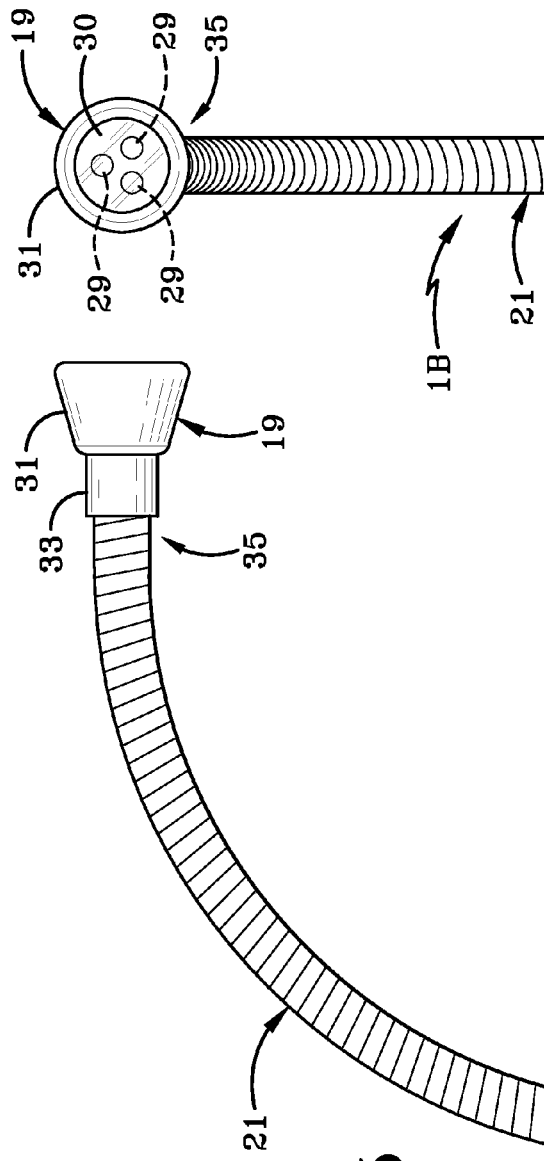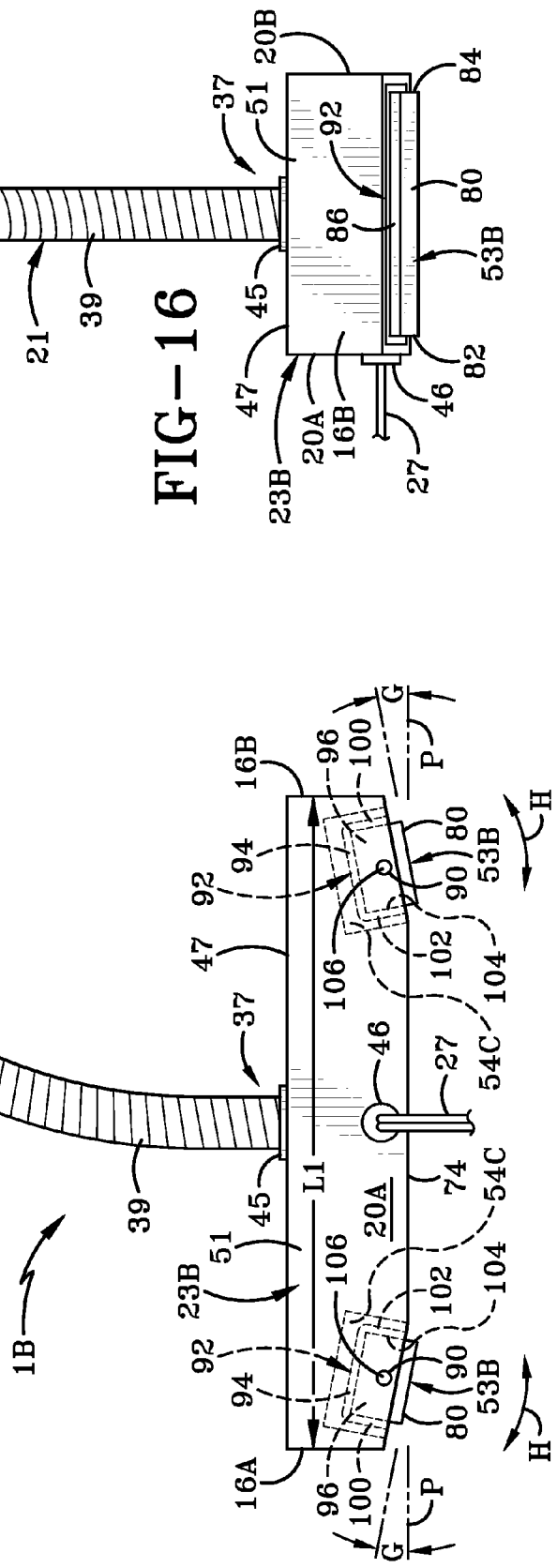

MAGNETICALLY MOUNTED LIGHT FOR USE IN INSPECTING STEEL BELTED TIRES

CROSS REFERENCE TO RELATED APPLICATIONS

This application claims priority from U.S. Provisional Application Ser. No. 61/205,945 filed Jan. 26, 2009; the disclosure of which is incorporated herein by reference.

BACKGROUND OF THE INVENTION

1. Technical Field

The present invention relates to tire inspection and repair. More particularly the present invention relates to a portable light and method for inspecting automobile tires. Specifically, the present invention relates to a lighting assembly which is magnetically mountable on a steel belted tire wall to hold the light assembly to the steel belt while inspecting the tire.

2. Background Information

As is well known, automobile tires are not fabricated just from rubber; they would be far too flexible and weak. A tire is made up of several different components. The outermost component is the tread layer, made from a mixture of natural and synthetic rubbers. The tread layer is typically formed using patterns that give the tire traction although certain racing tires known as slicks have a smooth outer surface. The next layer, comprised of belts made from steel, is used to reinforce the tire. These steel belts provide puncture resistance and help maintain the tire footprint when it makes contact with the road. The next layer includes different fabrics called body plies. The most common body ply fabric is polyester cord. The body plies are coated with rubber to help them bond with the other components such as the innerliner which seals in the air when the tire is mounted on the rim of a wheel. Tires are periodically checked for internal and external wear. Depending on the extent of the damage, the tire may be repaired or scrapped for safety. An important part of a tire safety check is inspecting the inside of the tire itself. The innerliner is inspected for blisters, bubbles, cracks, or the body ply showing through. Even the smallest amount of damage to the innerliner could indicate a hole in the tire itself. The inspector typically uses a light or other visual enhancement mechanism to allow better viewing of the innerliner. However, the shape of the tire, with extending circumferential sidewalls, makes lighting the area difficult. A light needs to be flexible enough to move as needed by the inspector as the tire is rotated, as well as fit between the sidewalls to extend down proximate the innerliner. Further complicating this procedure, rotation of the tire itself typically requires two hands, requiring the inspector to pull the light out from between the sidewalls, set the light down, rotate the tire, pick the light back up, and insert it back in between the sidewalls. This is a rather time consuming process. The inspector may be enticed into checking the tires too quickly because of the length of time required to move the light every time the tire needs rotated during an inspection. This may lead to sloppy inspections and ultimately dangerous tires being approved for road use.

Therefore, the need exists for a light assembly and a method of using the same which facilitates inspection of the inside of a tire and overcomes the problems noted above.

BRIEF SUMMARY OF THE INVENTION

The present invention provides a method comprising the steps of: inserting a magnet of a light assembly between opposed sidewalls of a tire into an annular interior chamber defined between the sidewalls; mounting the light assembly on an inner surface of the tire by magnetically coupling the inserted magnet at a first location to an embedded belt layer of the tire; illuminating the inner surface of the tire with a light source of the mounted light assembly; and inspecting visually a first portion of the illuminated inner surface.

The present invention also provides a light assembly for use in inspecting the inside of a vehicle tire which comprises a tread wall with an embedded belt layer containing a ferrous metal and a pair of spaced sidewalls secured to and extending radially inwardly from the tread wall wherein the tread wall has a concavely curved inner surface which faces radially inwardly; the light assembly comprising: a base; a light source mounted on the base; and first and second magnets of the base which are spaced from one another and have respective outer surfaces configured to magnetically couple the base to the belt layer at first and second circumferentially spaced locations of the concavely curved inner surface.

BRIEF DESCRIPTION OF THE SEVERAL VIEWS OF THE DRAWINGS

Preferred embodiments of the invention, illustrated of the best modes in which Applicant contemplates applying the principles, are set forth in the following description and are shown in the drawings and are particularly and distinctly pointed out and set forth in the appended claims.

FIG. 2 is a side elevational view of the first embodiment of the present invention removed from the tire.

FIG. 3 is an end elevational view of the light assembly of FIG. 2.

FIG. 11 is a side elevational view similar to FIG. 2 of a third embodiment of the present invention.

FIG. 12 is an end elevational view of the third embodiment of FIG. 11.

FIG. 15 is a side elevational view similar to FIG. 2 of the fourth embodiment of the present invention.

FIG. 16 is an end elevational view of the fourth embodiment.

Similar numbers refer to similar parts throughout the drawings.

DETAILED DESCRIPTION OF THE INVENTION

Figure 6:
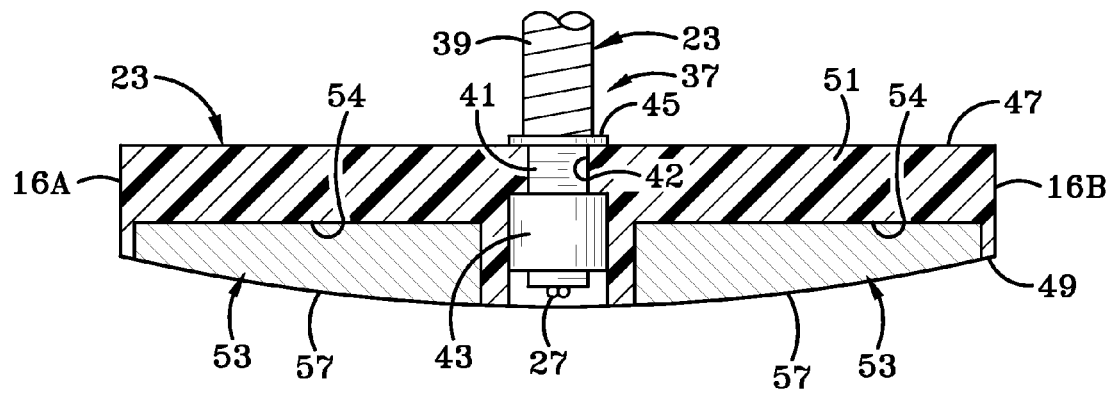
FIG. 6 is a sectional view taken on line 6-6 of FIG. 4.
Figure 7:
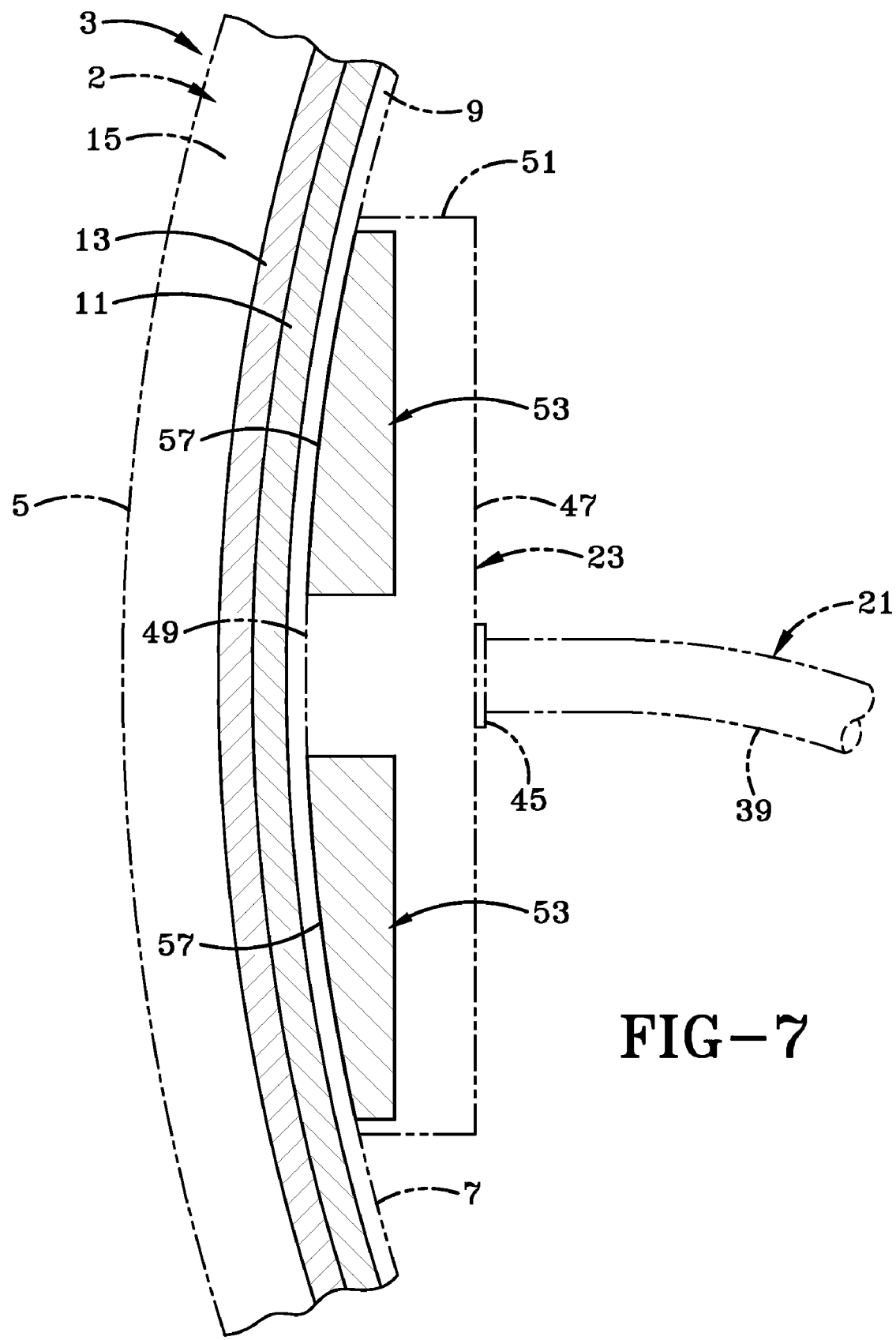
FIG. 7 is an enlarged sectional view of the base of the first embodiment and a portion of a tire, with parts shown in phantom.
Figure 8:
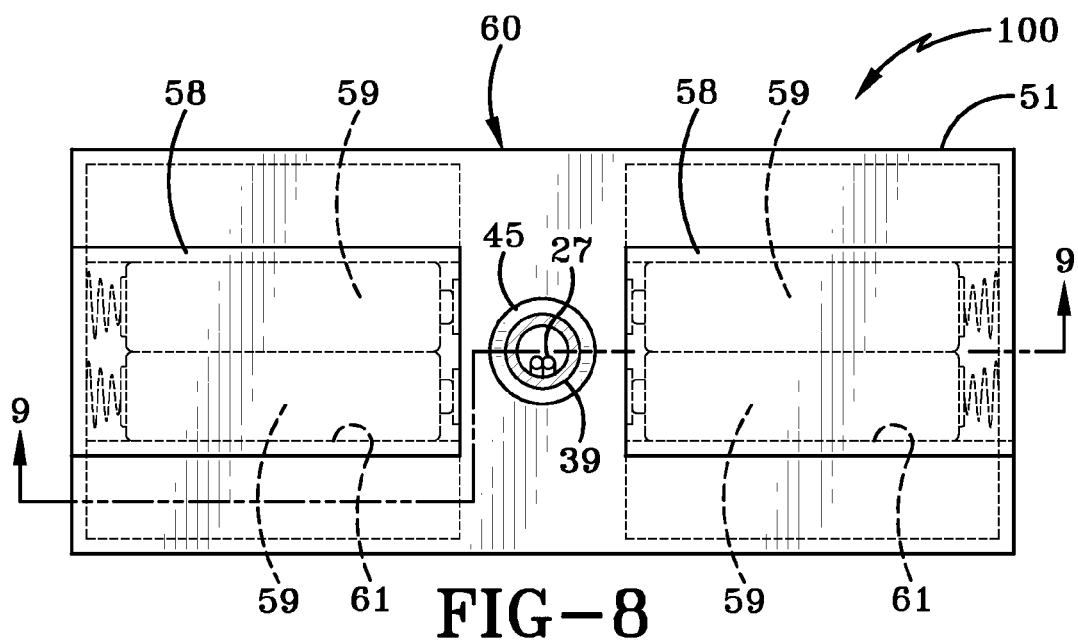
FIG. 8 is a sectional view of the base of a second embodiment of the light assembly of the present invention, similar to FIG. 4.
Figure 9:
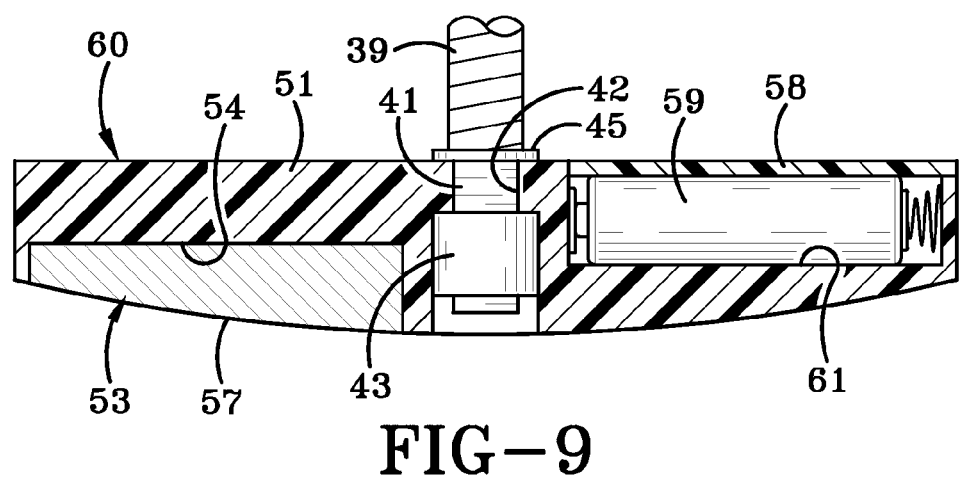
FIG. 9 is a sectional view taken on line 9-9 of FIG. 8.
Figure 13:
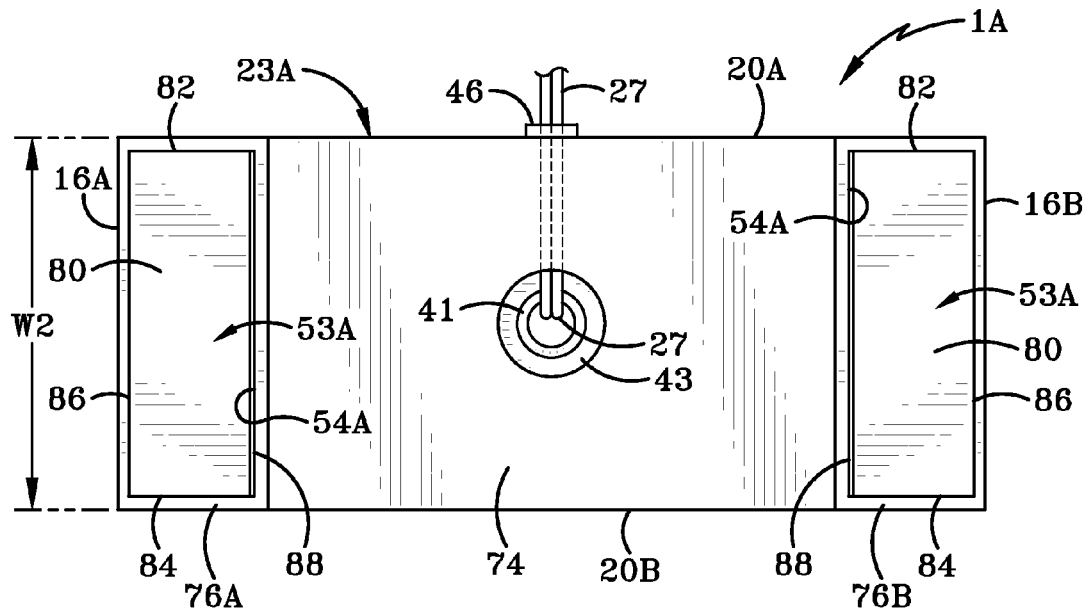
FIG. 13 is a bottom plan view of the third embodiment.
Figure 17:
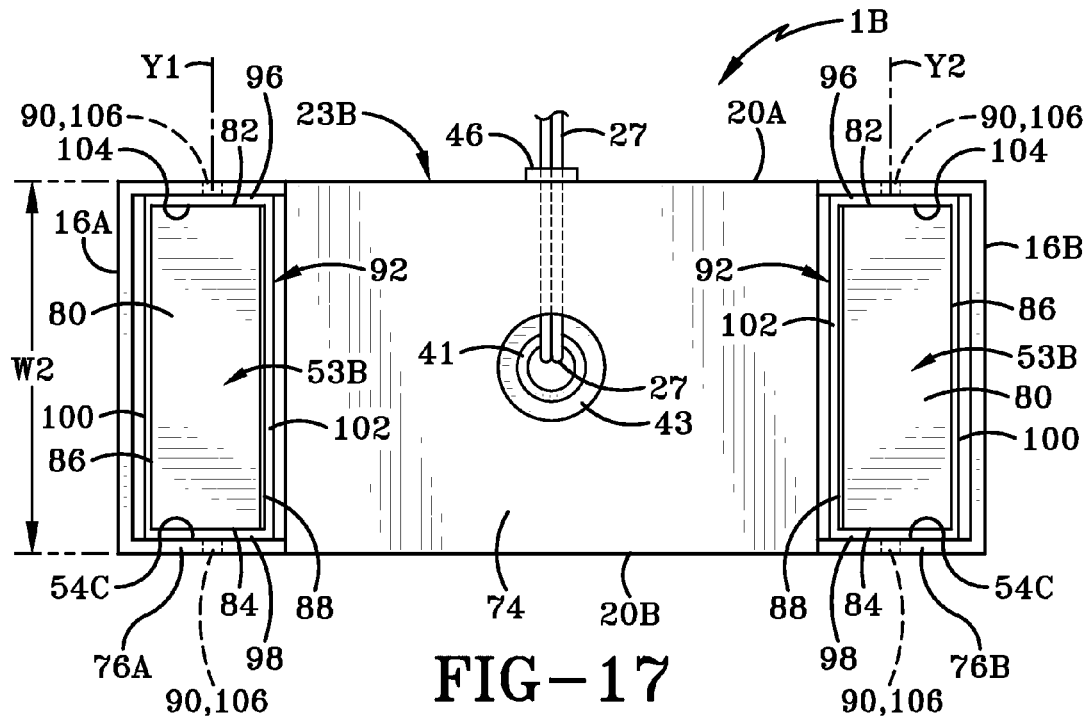
FIG. 17 is a bottom plan view of the fourth embodiment.

A first embodiment of the magnetically mountable light assembly of the present invention is generally indicated at 1, and is shown in FIGS. 1-7; the base of a second embodiment of the light assembly is shown generally at 60 in FIGS. 8-9; a third embodiment of the light assembly is shown generally at 1A in FIGS. 11-13; and a fourth embodiment of the light assembly is shown generally at 1B in FIGS. 15-17. Each of the light assemblies 1 is configured to magnetically mount on a standard steel belted vehicle tire 3.

Figure 1:
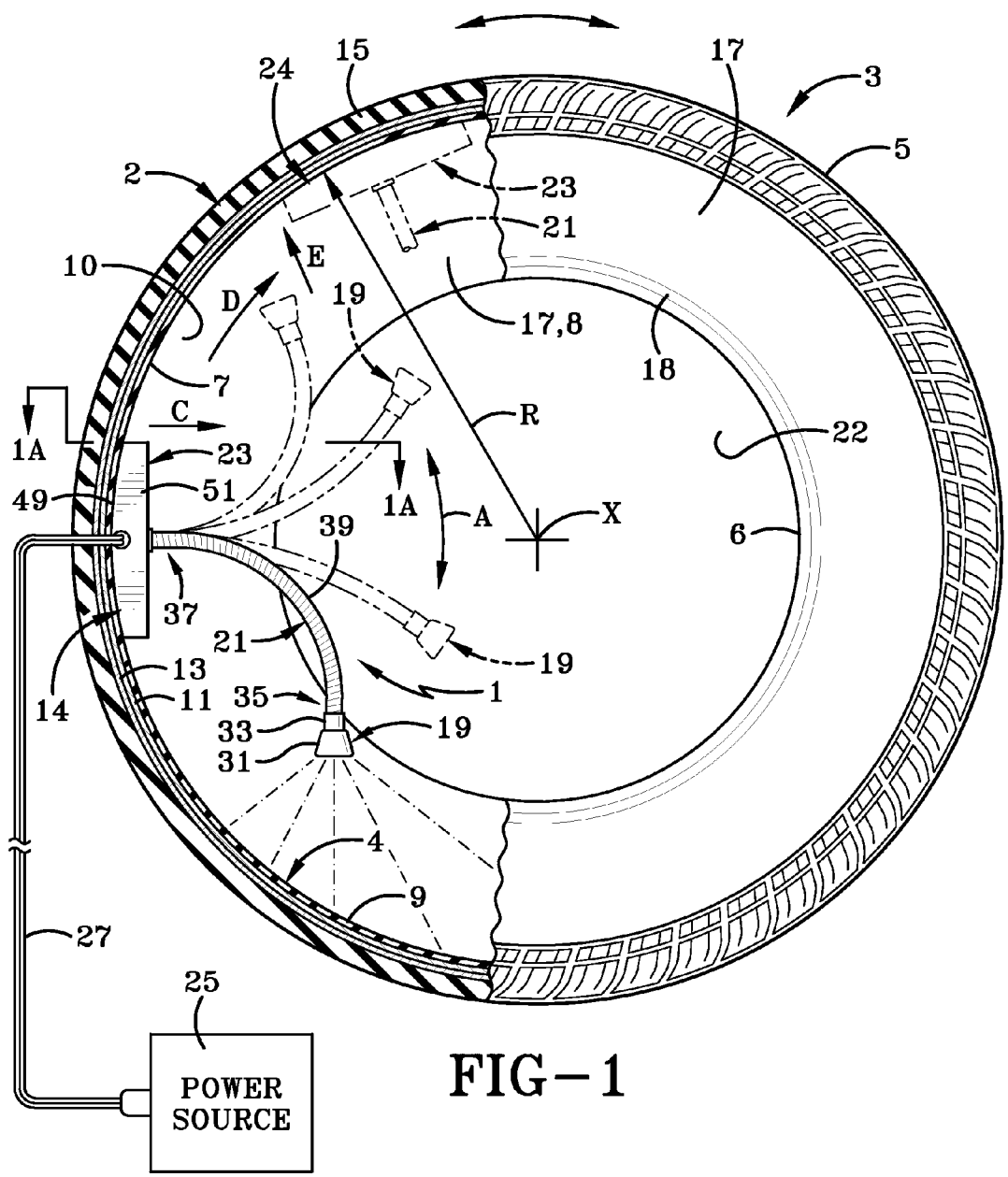
FIG. 1 is a side view of a first embodiment of the light assembly of the present invention mounted within a tire with parts cut away.

Referring to FIG. 1, tire 3 is described now in further detail. Tire 3 is a typical pneumatic tire including a substantially cylindrical tread wall 2 which includes four layers: an innerliner 9, an embedded ply layer 11, an embedded steel belt layer 13, and a tread layer 15. Innerliner 9, ply layer 11 and steel belt layer 13 form a substantially cylindrical carcass or casing 4 to which tread layer 15 is secured to tread wall 2. Tire 3 includes a substantially cylindrical convexly curved outer surface 5 and a substantially cylindrical concavely curved inner surface 7 each of which is concentric about an axis X about which tire 3 rotates when mounted on a vehicle during operation. Inner surface 7 is defined by innerliner layer 9 and faces radially inwardly toward axis X and outer surface 5 is the radially outwardly facing side or surface of tread layer 15. Tire 3 further includes two substantially circular annular sidewalls 17 which are axially spaced from one another, attached at respective circular outer perimeters thereof to the respective circular outer sides or edges of tread wall 2 and extend radially inwardly therefrom to terminate in an annular bead area or bead 18 having a circular annular terminal edge 6 which faces radially inwardly.

Figure 1A:
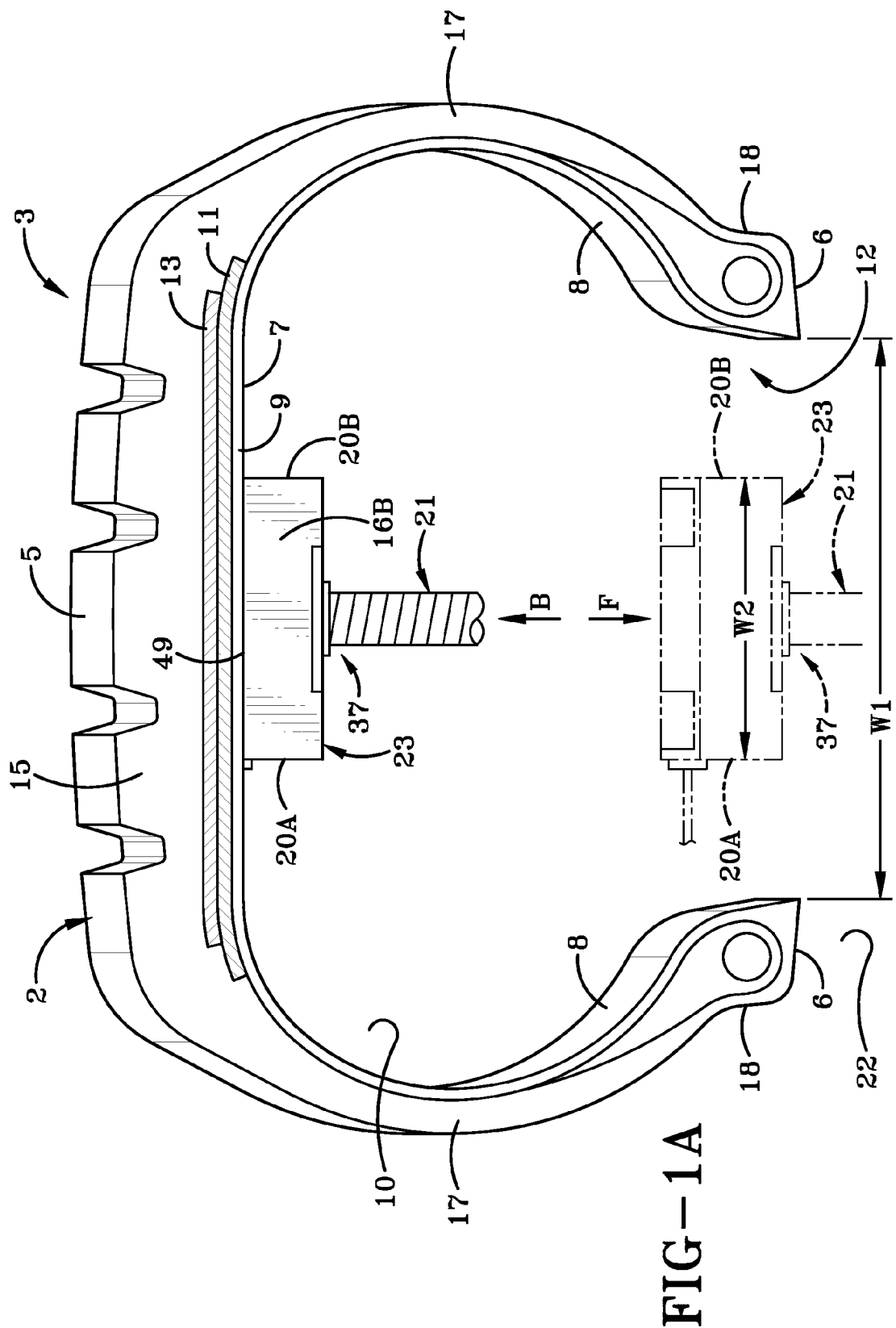
FIG. 1A is a sectional view taken on line 1A-1A of FIG. 1 showing the base of the light assembly in solid lines mounted on the tread wall and in dashed lines positioned between the beads of the side walls illustrating insertion or removal thereof.

Referring now to FIG. 1A, side walls 17 have respective inner surfaces 8 which face one another and extend radially outwardly from respective circular connections with inner surface 7 to terminal edges 6 respectively. Surface 7 of tread wall 2 and surfaces 8 of side walls 17 define therewithin a cavity or an interior chamber 10 of tire 3 having a circular entrance opening 12 defined between terminal edges 6 whereby chamber 10 thus opens radially inwardly. Inner surfaces 8 of beads 18 of side walls 17 define therebetween an axial distance or width W1 parallel to axis X. As is well known, side walls 17 are somewhat flexible such that beads 18 may be forced axially inwardly or outwardly. Thus, axial width W1 is measured when side walls 17 are in a state of rest without external forces applied thereto.

Referring to FIGS. 1-3, light assembly 1 includes a light source 19 connected to a rigid base 23 by a flexible elongated neck 21. Light source 19 may include any common lighting elements, but as shown in FIGS. 2 and 3, includes a plurality of light emitting diodes (LEDs) or bulbs 29 held in a casing 30 surrounded by a focus cone 31. Light source 19 is attached to neck 21 by an attachment collar 33 at a first end 35 of neck 21. A second end 37 of neck 21 is attached to base 23, wherein second end 37 is opposite and spaced apart from first end 35.

Referring to FIGS. 1, 2, and 6, neck 21 includes a flexible inner tube 41 encased by a flexible outer sleeve 39 extending between first and second ends 35 and 37. As shown by arrow "A" in FIG. 1, neck 21 is bendable relative to base 23 so that neck 21 and light source 19 are able to move in various directions while base 23 remains in a fixed first position or location 14 within the tire. Proximate second end 37 of neck 21, tube 41 extends into a hole 42 (FIG. 6) formed in base 23 where it is secured by a washer 45 and an attachment nut 43.

A pair of electrical conductors 27 extends through tube 41 to supply electric power to light source 19. Conductors 27 are encased in an electrically insulating outer coating and extend out of base 23 through a cord retainer grommet 46 in base 23 to supply the electric current from a power source 25 (FIG. 1) to light source 19. FIG. 1 shows a plug at the end of conductors 27 distal base 23 wherein the plug may be plugged into a standard outlet or other power source 25 such that the plug serves as a switch for turning light source 19 on or off. The electrical circuitry of assembly 1 may utilize an electrical switch at any suitable location.

Referring to FIGS. 1-7, base 23 is described in greater detail. Base 23 includes a flat base plate 51 and has first and second ends 16A and 16B defining therebetween a length L1 (FIG. 2) of base 23, first and second sides 20A and 20B defining therebetween a width W2 (FIGS. 1A, 5) of base 23, a flat top surface 47 which extends from first end 16A to second end 16B and from first side 20A to first side 20B, and a curved bottom surface 49 which extends from first end 16A to first end 16B and from first side 20A to first side 20B. As shown in FIG. 1A, width W2 is typically less than width W1 and should be no more than width W1 to facilitate the insertion of base 23 into interior chamber 10 through entrance opening 12. Typically, length L1 is greater than width W2 to add stability to the light assembly when mounted within tire 3. As is readily evident from the figures, the diameter or width of light source 19 is substantially less than length L1 and width W2, and thus substantially less than width W1 so that light source 19 may be easily inserted between side walls 19 into interior chamber 10 and easily moved within the chamber. Base plate 51 preferably includes a non-metallic material, such as plastic.

Figure 4:
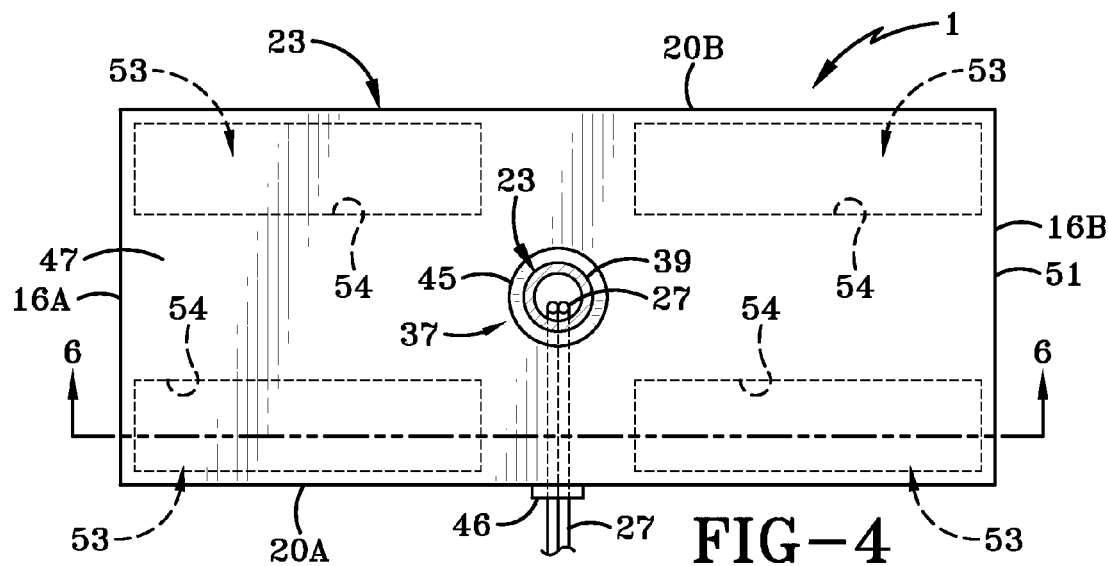
FIG. 4 is a sectional view taken on line 4-4 of FIG. 2.
Figure 5:
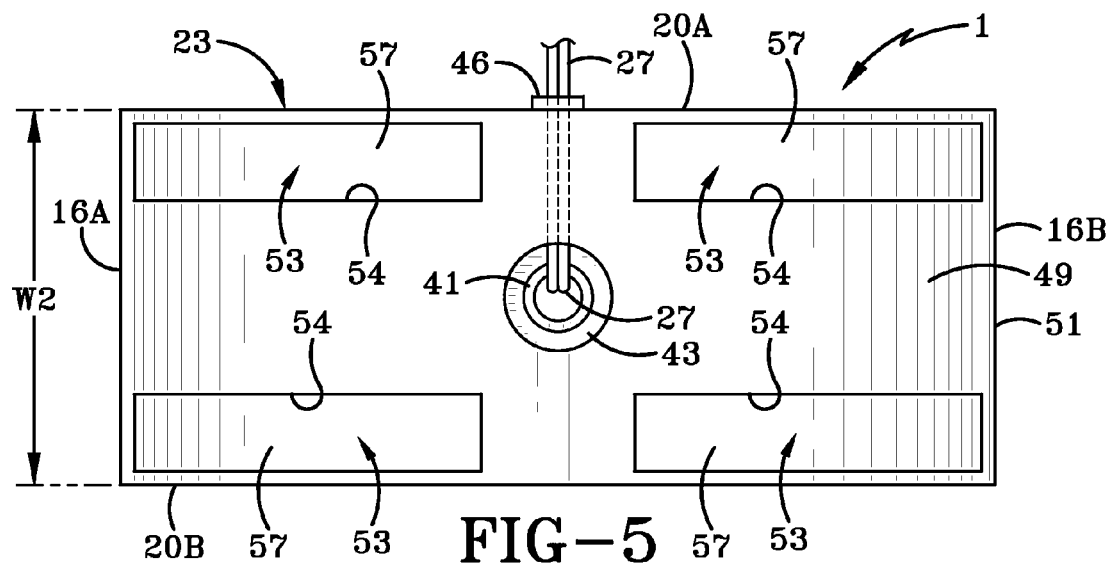
FIG. 5 is a bottom plan view of the first embodiment.

As shown in FIGS. 2 and 6 and in accordance with the invention, bottom outer surface 49 is smooth and convexly curved as viewed from the side from first end 16A to second end 16B in a continuous manner and has a radius of curvature generally equal to the radius of curvature of inner surface 7 of tire 3, which is defined by radius R of inner surface 7, as shown in FIG. 1. Bottom surface 49 is substantially flat as viewed from the end, as shown in FIGS. 1A and 3. As shown in FIGS. 4-6, base 23 includes a plurality of magnets 53 spaced apart and secured within complementary shaped compartments 54 formed in base 23. Compartments 54 have respective bottom entrance openings at bottom surface 49 such that the bottom surfaces of magnets 53 are exposed. The embodiment shown in FIGS. 1-7 contains four magnets 53. The polarity of magnets 53 is aligned such that magnets 53 work in concert to attract objects containing ferrous metals. As shown in FIG. 6, magnets 53 include a convexly curved bottom side or surface 57 which forms part of surface 49 and thus follows the same radius of curvature. Thus, curved surface 49 of base 23 is configured to mate or conform to and thus fit snugly against inner surface 7.

As shown in FIGS. 1, 1A and 7, surface 49 of base 23 fits flush against inner surface 7 of tire 3. Base 23 is magnetically held to inner surface 7 because steel belt layer 13 contains ferrous metals which are attracted to the magnetic field of magnets 53. As base 23 is positioned against inner surface 7, the magnetic field emanating from magnets 53 draws base 23 against inner surface 7 because of steel belt layer 13, enabling light 1 to remain fixed against inner surface 7 while tire 3 is manipulated. Curved surface 49 enables base 23 to be positioned as close as possible to inner layer 7 and in turn increases the magnetic hold between magnets 53 and steel belt layer 13 due to the proximity of these elements to one another.

As discussed in the Background section above, tires 3 routinely require a safety inspection to check for defects such as blisters, bubbles, cracks, or small holes. Outer surface 5 includes tread layer 15 having varying shapes, valleys and grooves which makes a thorough visual inspection very difficult in locating holes, cracks, etc. The relatively smooth inner surface 7 of tire 3 shows defects more clearly although it is more difficult to see because sidewalls 17 tend to block light from penetrating into the tire cavity or interior chamber 10 formed between sidewalls 17. Light assembly 1 facilitates illuminating inner surface 7, while allowing the user to grip and turn tire 3 with both hands.

Figure 10:
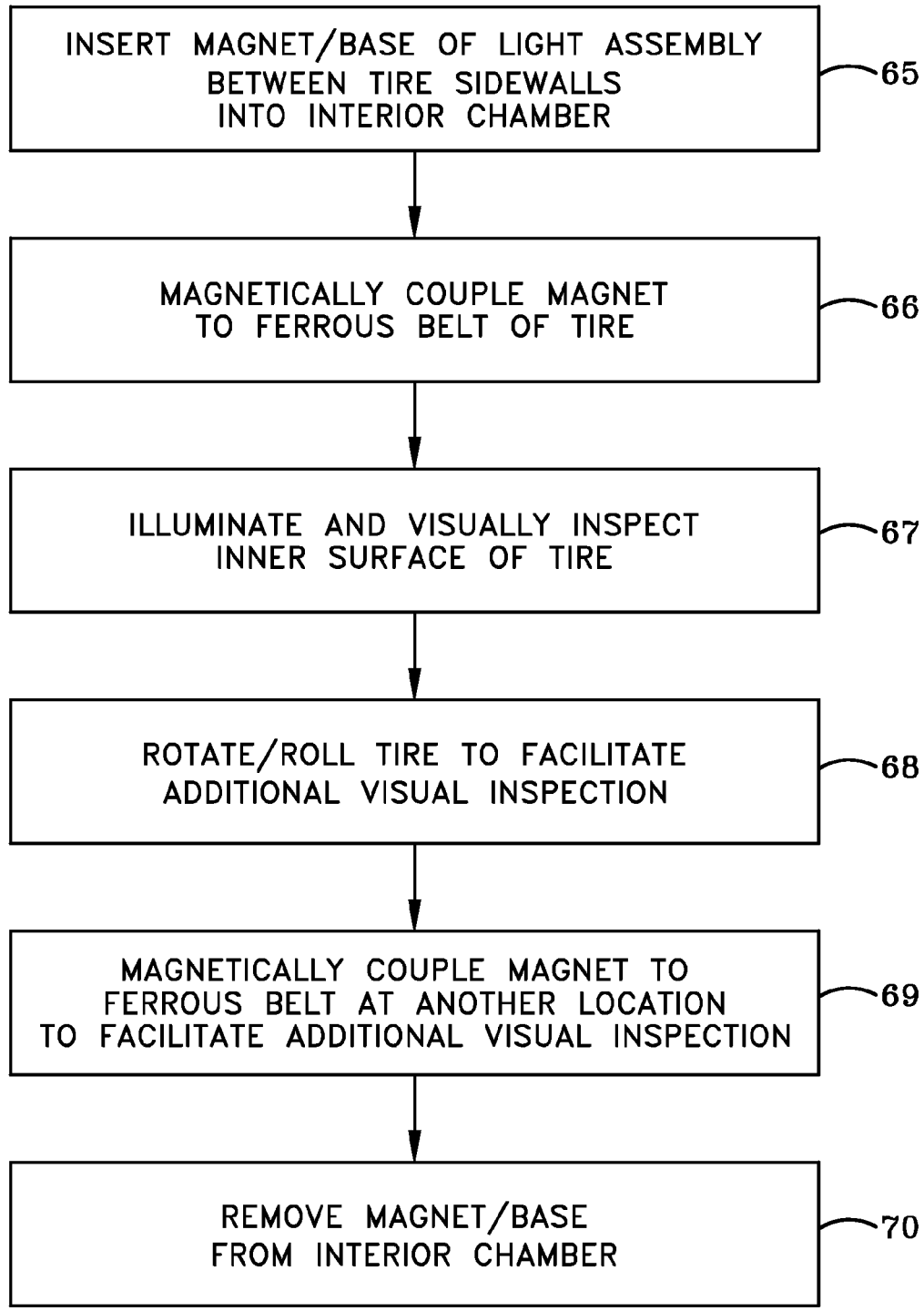
FIG. 10 is a block diagram illustrating the basic steps of the method of the present invention.

The operation and use of light assembly 1 for inspecting the inside of tire 3 is now described with primary reference to FIGS. 1, 1A and 10. Light assembly 1 is first moved into cylindrical rim-receiving space 22, after which base 23 including magnets 53 and a portion of neck 21 adjacent base 23 are inserted through entrance opening 12 between beads 18 of side walls 17 into interior chamber 10, as indicated at block 65 in FIG. 10 with sides 20A and 20B respectively facing beads 18. Base 23 thus moves beyond beads 18 so that curved bottom surface 49 of base 23 engages curved inner surface 7 of inner liner 9 in a mating fashion in order to magnetically couple magnets 53 to ferrous belt 13 of tire 3 (block 66) to mount base 23 to tread wall 2 at first location 14 (FIG. 1). When base 23 is mounted on inner surface 7, sides 20A and 20B respectively face inner surfaces 8 of side walls 17 while ends 16A and 16B face circumferentially away from one another. As needed, the user can then move or adjust the position of light source 19 relative to base 23 and tire 3 via the bending or flexing of adjustable neck 21 in order to adjust and set light source 19 at any selected position, such as those illustrated in FIG. 1. Light source 19 is turned on to illuminate inner surfaces 7 and 8 of tire 3 so that the user can visually inspect said inner surfaces, as noted at block 67 in FIG. 10. As illustrated in FIG. 1, light source 19 may be positioned and moved within interior chamber 10 or external thereto within space 22 while base 23 is magnetically coupled at first location 14 such that base 23 is securely held and fixed relative to tire 3 during the repositioning of light source 19. The user may position light source 19 at a given position in order to illuminate and inspect a first portion or section of the inner surfaces of the tire, then reposition light source 19 to illuminate and visually inspect another portion or section of the inner surfaces of the tire while base 23 remains at first location 14. The user typically handles tire 3 manually during the inspection process and thus the magnetic mounting of base 23 on tire 3 allows the inspector to manipulate the tire with both hands in order to reposition the tire as needed to facilitate the inspection of various sections of the inner surface of the tire. The inspector may rotate or roll tire 3 about axis X (arrows above tire in FIG. 1) at various times in order to facilitate additional visual inspection, as indicated at block 68 of FIG. 10. This rotation or rolling of the tire may be done while base 23 remains magnetically coupled at the first location 14 or after the removal of base 23 from location 14. In order to properly visually inspect the inner surface of the tire adjacent first location 14, the inspector will typically remove base 23 from first location 14 by pulling radially inwardly (Arrow C in FIG. 1) with a sufficient force to magnetically decouple magnets 53 from belt 13. Base 23 may then be moved circumferentially along the tire walls (arrow D in FIG. 1) and then moved radially outwardly (arrow E) to magnetically couple the magnets 53 to ferrous belt 15 at a second location in contact with inner surface 7 to facilitate additional visual inspection (block 69), including inspecting the inner surfaces defining first location 14 from which base 23 was removed, as well as the inner surfaces adjacent location 14. As represented in FIG. 1, magnets 53 are thus sufficiently strong and properly configured in order to mount light assembly 1 with base 23 at first location 14 with top and bottom surfaces 47 and 49 positioned substantially vertically and neck 21 extending laterally outwardly therefrom or at second location 24 with top and bottom surfaces 47 and 49 generally or substantially horizontal such that base 23 and the rest of light assembly 21 are upside down with neck 21 and light source 19 hanging downwardly from base 23. Bottom surface 49 thus faces to the side when mounted at first location 14 and faces upwardly when mounted at second location 24. Base 23 may be moved circumferentially as indicated at arrow D from one location 14 to another location 24 without separating base 23 from inner surface 7, whereby bottom surface 49 may slidably engage inner surface 7 during such circumferential movement of base 23. Base 23 may be moved circumferentially and magnetically coupled to belt 13 along any location on inner surface 7 around tread wall 2 as needed in order to complete the inspection. Upon completion of the inspection, the inspector will pull light assembly 1 radially inwardly as previously discussed to magnetically decouple magnets 53 from belt 13 such that base 23 is separated from inner liner 9. Base 23 then continues to move radially inwardly away from inner surface 7 (arrow F in FIG. 1A) in order to remove magnets 53 and base 23 along with a portion of neck 21 from within interior chamber 10 (block 70 in FIG. 10) through entrance opening 12 between beads 18 and side walls 17 into space 22, and then out of space 22 and away from tire 3. Light assembly 1 may then be used with another tire in a similar manner.

In the second embodiment shown in FIGS. 8-9, neck 39 and light source 19 are connected to a modified base 60. A plurality of batteries 59 are removably contained in complementary shaped compartments 61 formed in modified base 60. Batteries 59 are coupled to electrical conductors 27 in any of the typical attachments used in the art of battery assemblies. Like the first embodiment, electrical conductors 27 extend through tube 41 to supply electric power to light source 19 from batteries 59. Unlike the first embodiment where conductors 27 extend out of base 23 to supply the electric current from an external power source 25 (FIG. 1), in the second embodiment conductors 27 are contained within base 60.

An access door 58 is provided in base 60 adjacent each compartment 61 to access batteries 59. This embodiment provides an additional benefit to the user in that there are no conductors 27 extending out of the base requiring connection to external power supply 25. This allows the user to inspect tire 3 without being in close proximity to a common outlet style power source. For example, the user may inspect tire 3 on a roadside or driveway, each being a distance from an external power source. The absence of external conductors 27 also lets the user work and manipulate tire 3 without the conductors 27 being in the way and eliminates the possibility that the user's manipulations of tire 3 will pull conductors 27 out of power source 25. The remaining features and construction of base 60 is similar to that described above for base 23 and thus and not described in further detail.

Light assembly 1A is now described in greater detail. Light assembly 1A is similar to light assembly 1 except that light assembly 1A includes a base 23A having a different configuration and magnets 53A which are mounted differently than in assembly 1. More particularly, base 23A has a bottom surface including a straight flat bottom section 74 making up the vast majority of the bottom surface. The bottom surface further includes beveled corners or angled surfaces 76A and 76B which angle upwardly in opposite directions from the respective ends of bottom section 74 to the respective opposed ends 16A and 16B of base 23A. Surfaces 76 are illustrated as substantially straight although they may curve somewhat, preferably in a convex manner similar to surface 49 of base 23 of assembly 1.

Magnets 53A are configured and oriented somewhat differently than magnets 53 in light assembly 1. Each magnet 53A is disposed in a magnet compartment 54A formed in base 23A extending upwardly from the bottom surface thereof along the respective angled surface 76. Each compartment 54A is typically roughly the same shape as magnet 53A and slightly larger in order to accommodate the magnet, which may be secured within compartment 54A by glue, adhesive or by any other suitable securing mechanism known in the art.

Each magnet 53A has a top or top surface 78, a bottom or bottom surface 80 which is substantially flat, first and second ends 80 and 82 defining therebetween the longer dimension of the magnet, and first and second sides 86 and 88 defining therebetween a shorter dimension of the magnet. Each magnet 53A in the exemplary embodiment is more or less rectangular as viewed from the top, end or side, and has a parallelepiped configuration. In contrast to magnets 53 of the first embodiment, magnets 53A are elongated from side to side with respect to base 23A. More particularly, first end 82 is adjacent first side 20A while second end 84 is adjacent second side 20B of base 23A. First side 86 is disposed adjacent the respective end 16A or end 16B. Second sides 88 face one another and are respectively adjacent the respective intersection between bottom section 74 and the respective angled surface 76A or 76B. Bottom surfaces 80 of magnets 53A are respectively parallel to angled surfaces 76A and 76B whereby each bottom surface 80 and the plane in which bottom section 74 lies defines therebetween an angle G. Each angled surface 76 and the plane P in which bottom section 74 lies thus also define therebetween angle G, which in the exemplary embodiment is typically in the range of about 5 or 10 to 15, 20, 25 or 30 degrees, and usually about 15 to 25 degrees. Bottom surfaces 80 of the respective magnets 53A define therebetween an angle K which is typically within the range of about 120 to 170 degrees. Angle K is typically within the range of 130, 140 or 150 degrees to about 170 degrees. Angled surfaces 76A and 76B thus also define therebetween angle K.

Figure 14:
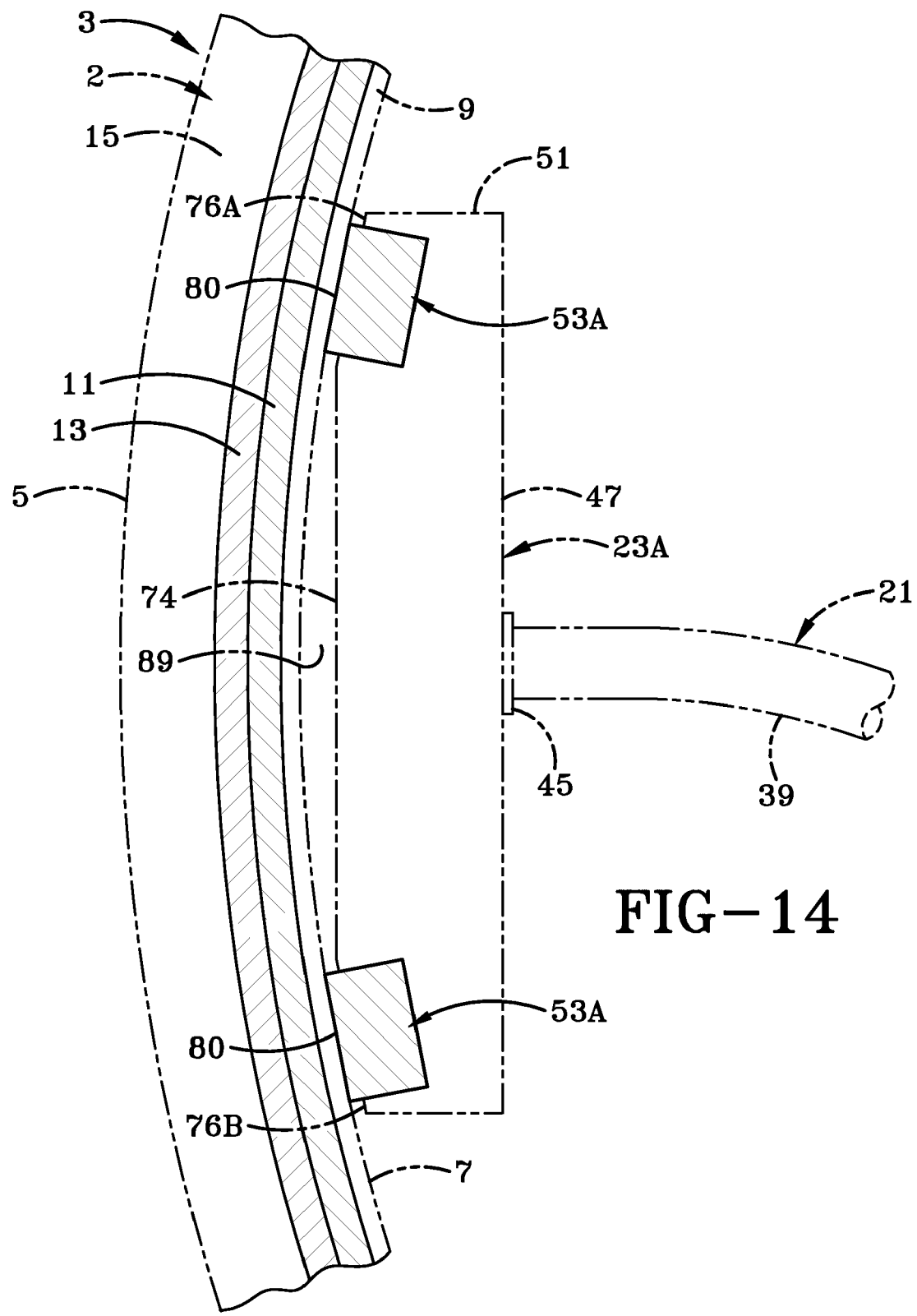
FIG. 14 is an enlarged sectional view similar to FIG. 7 showing the base of the third embodiment mounted on a portion of a tire.
Figure 18:
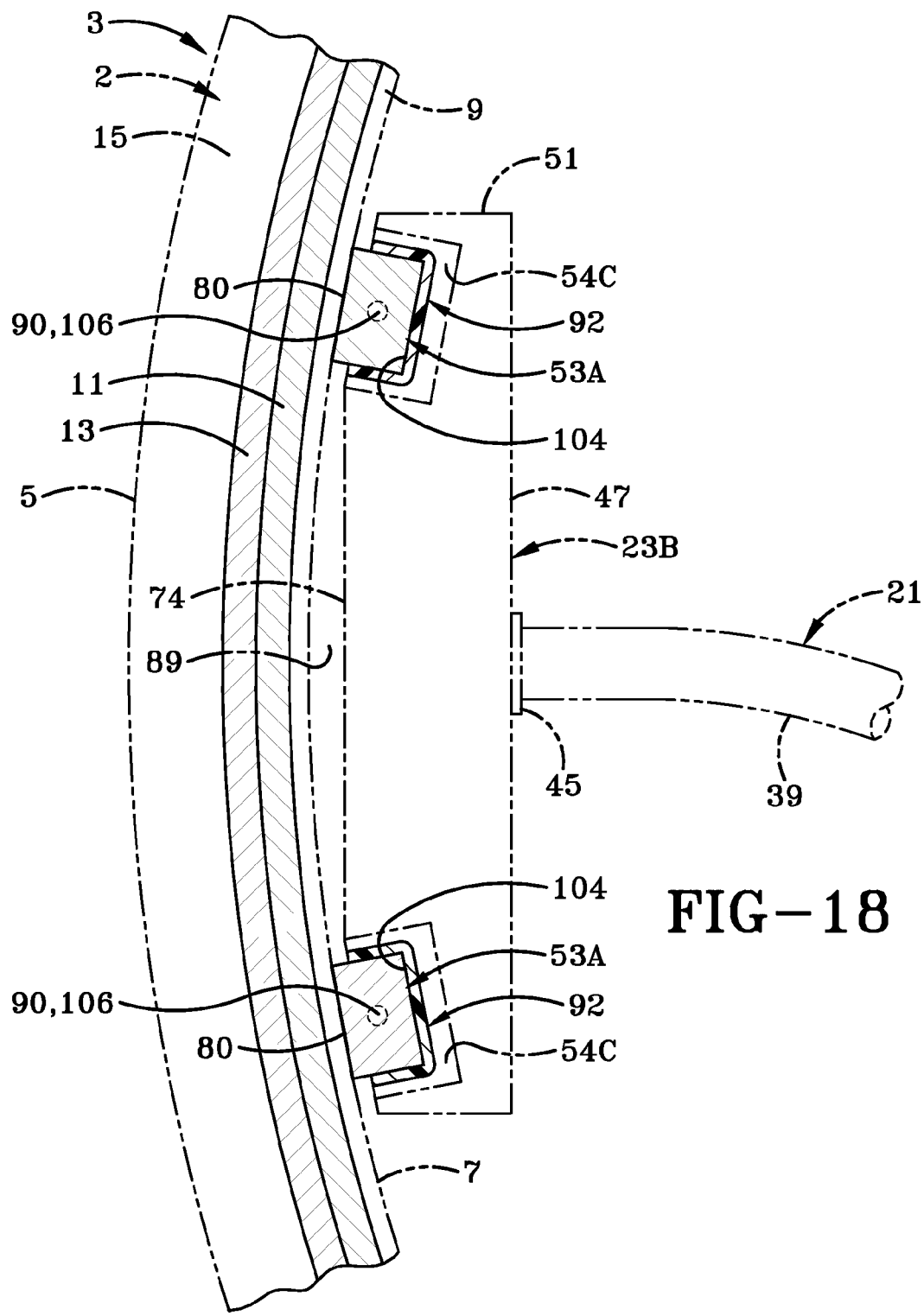
FIG. 18 is an enlarged sectional view similar to FIG. 7 showing the base of the fourth embodiment mounted on a portion of a tire.

In the exemplary embodiment, bottom surfaces 80 extend downwardly beyond angled surfaces 76A and 76B respectively although the surfaces may be flush. As shown in FIG. 14, bottom surfaces 80 are configured to be closely adjacent or abut inner surface 7 of inner liner 9 when base 23 is magnetically coupled to belt layer 13. As illustrated in FIG. 14, section 74 of the bottom surface of base 23A is spaced radially inwardly from inner surface 7, while bottom surfaces 80 of the respective magnets engage and are substantially flush with inner surface 7, and angled surfaces 76 are closely adjacent inner surface 7. As previously noted, bottom surfaces 80 may be flush with angled surfaces 76 whereby angled surfaces 76 may also be in contact with inner surface 7 when base 23A is mounted inside the tire. Thus, the bottom surface of base 23A is spaced radially inwardly from inner surface 7 from adjacent angled surface 76A and the corresponding magnet to adjacent angled surface 76B and the corresponding magnet. More particularly, section 74 and inner surface 7 define therebetween a circumferentially elongated space 89 extending from adjacent each respective angled surface and magnet to the other respective angled surface and magnet and from first side 20A to second side 20B of base 23A. This configuration allows base 23A to more easily be mounted on tires having different diameters or a different radius R (FIG. 1) inasmuch as the configuration of base 23A eliminates the portion of curved surface 49 of base 23 as well as certain portions of magnets 53 of base 23 which may otherwise contact the inner surface of a tire of a given diameter such that the magnets could be spaced radially inwardly away from inner surface 7, thereby diminishing the ability to magnetically couple with belt layer 13. Magnets 53A are thus positioned such that bottom surfaces 80 would be substantially flush with inner surface 7 of a tire having a given diameter whereas bottom surfaces 80 may be angled somewhat with respect to the inner surface 7 of a different tire having a different diameter. Nevertheless, at least a portion of the magnet is preferably in contact with inner surface 7 of any given tire on which base 23A is mounted or sufficiently close to inner surface 7 in order to properly mount base 23A via the magnetic coupling with belt layer 13.

Light assembly 1B is similar to light assembly 1A except that it is configured for the rotatable or pivotable mounting of magnets 53B within compartments 54C which are formed in base 23B and extend upwardly from the bottom surface thereof respectively adjacent the angled surfaces 76A and 76B. Compartments 54C are similar to compartments 54B except somewhat larger in order to accommodate a pivotable magnet carriage 92 therein. Base 23B defines four pivot holes 90 such that two of holes 90 are formed along first side 20A and communicate respectively with the compartments 54C while two of the holes 90 are formed along second side 20B in communication with respective to compartments 54C. Thus, two of holes 90 communicate with a given compartment 54C and are disposed on opposite sides of said compartment 54C in alignment with one another. An axis Y1 extends through one set of holes 90 of one of the compartments of 54C and another parallel axis Y2 extends through the pair of holes 90 associated with the other compartment 54C.

Each magnet carriage 92 is configured to carry the respective magnet 53C such that one of carriages 92 and the corresponding magnet pivots about axis Y1 and the other magnet carriage 92 pivots about the other pivot axis Y2, as shown by Arrows H in FIG. 15. Each magnet carriage 92 is substantially rectangular and includes flat parallel first and second end walls 96 and 98 which are spaced from one another, and first and second flat parallel side walls 100 and 102 which are spaced from one another. Side walls 100 and 102 are secured to and extend between end walls 96 and 98. Thus, top wall 94, end walls 96 and 98, and side walls 100 and 102 define therewithin a magnet compartment 104 which receives the respective magnet 53B therein. Compartment 104 is approximately the same shape and slightly larger than magnet 53B in the exemplary embodiment. Each magnet 53B is thus secured within compartment 104 by glue, adhesive or other suitable securing mechanism.

Each carriage 92 further includes a pair of pivot pins 106 which are rigidly secured to and extend outwardly away from one another from respective end walls 96 and 98. Pivot pins 106 are respectively received within pivot holes 90 such that axis Y1 passes through the pivot pins 106 of the carriage 92 within one of compartments 54C while axis Y2 passes through the pivot pins 106 of carriage 92 in the other compartment 54C. Each magnet carriage 92 and the corresponding magnet 53B is thus partially disposed within the corresponding compartment 54C in base 23B. As illustrated by arrows H in FIG. 15, each carriage 92 and corresponding magnet 53B is pivotable or rotatable to a limited degree about the corresponding pivot pins and corresponding axes Y1 and Y2 in order to adjust the angle at which bottom surface 80 is disposed. Thus, bottom surface 80 of each magnet 53B and the plane is which section 74 lies may define therebetween angle G, or other angles which may be less or greater than the angle at which the bottom surfaces 80 of magnets 53A of light assembly 1A are set. The ability to pivot one or more of magnets 53B relative to base 23B thus allows the angles of the bottom surfaces of said magnets to be adjustable in order to conform to the angles of a given tire of any particular diameter or radius.

Light assembly 1B is used to inspect tires similar to that described with reference to light assembly 1 and with reference to the basic steps illustrated in FIG. 10. Light assembly 1A and 1B are both configured to facilitate the ability for mounting on tires having diameters which are substantially different from one another although light assembly 1 will also mount on tires having different diameters. Light assemblies 1A and 1B are configured to better address greater differences in the respective diameters. In addition to the method of inspection, each carriage 92 and the corresponding magnet 53B will pivot or rotate about the respective axis Y1 or Y2 as base 23 is inserted between the side walls and moves toward inner surface 7 and thus belt layer 13. More particularly, due to the magnetic attraction between each magnet 53B and belt layer 13, each magnet 53B will rotate about the corresponding axis Y1 or Y2 such that the corresponding bottom surface of the given magnet faces the portion of the inner surface 7 adjacent thereto such that the bottom surface 80 is substantially flush with the portion of inner surface 7 which it engages. Each bottom surface 80 thus pivots to the appropriate angle G or the like in order to allow as much as bottom surface 80 of a given magnet to be near or in engagement with inner surface 7, and thus as close as possible to belt layer 13.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A method comprising the steps of:
    inserting a first magnet of a light assembly between opposed sidewalls of a tire into an annular interior chamber defined between the sidewalls;
    mounting the light assembly on an inner surface of the tire by magnetically coupling the inserted first magnet to an embedded belt layer of the tire at a first location;
    illuminating the inner surface of the tire with a light source of the mounted light assembly; and
    inspecting visually a first portion of the illuminated inner surface.

2. The method of claim 1 further comprising the steps of rotating the tire after the step of inspecting the first portion; and inspecting visually a second portion of the illuminated inner surface of the rotated tire.

3. The method of claim 2 wherein the steps of rotating and inspecting the second portion occur while the first magnet remains magnetically coupled at the first location.

4. The method of claim 2 further comprising, prior to the step of inspecting the second portion, the steps of moving the first magnet from the first location to a second location; and mounting the light assembly on the inner surface by magnetically coupling the first magnet at the second location to the embedded belt layer of the tire.

5. The method of claim 1 further comprising the steps of moving the first magnet from the first location to a second location; and mounting the light assembly on the inner surface by magnetically coupling the first magnet at the second location to the embedded belt layer of the tire.

6. The method of claim 1 further comprising the step of adjusting the light source relative to the first magnet and tire while the light assembly is mounted at the first location.

7. The method of claim 6 wherein the step of adjusting comprises the step of moving the light source within the interior chamber.

8. The method of claim 6 wherein the step of adjusting comprises the step of bending a flexible elongated neck extending between and mounted on the first magnet and light source.

9. The method of claim 6 wherein the step of adjusting comprises the step of moving the light source outside the interior chamber.

10. The method of claim 1 further comprising the steps of decoupling the first magnet from the inner layer of the tire; and moving the decoupled first magnet to a position outside the interior chamber.

11. The method of claim 1 further comprising the step of positioning the light source so that the light source is within the interior chamber while the first magnet is magnetically coupled at the first location.

12. The method of claim 1 wherein the first magnet is part of a base of the light assembly; and the step of mounting comprises the step of magnetically coupling the first magnet at the first position with an outer surface of the base facing upwardly against a downwardly facing portion of the inner surface.

13. The method of claim 1 wherein the first magnet is part of a base of the light assembly; and the step of mounting comprises the step of magnetically coupling the first magnet at the first position with an outer surface of the base in a generally vertical orientation against a generally vertical portion of the inner surface.

14. The method of claim 1 wherein the first magnet is part of a base of the light assembly; and the step of mounting comprises the step of magnetically coupling the first magnet at the first location with a convexly curved outer surface of the base against the inner surface wherein the inner and outer surfaces have respective radii of curvature which are about the same.

15. The method of claim 1 wherein the step of inserting comprises the step of inserting a second magnet of the light assembly between the opposed sidewalls of the tire into the annular interior chamber with the first and second magnets mounted on a base of the light assembly adjacent first and second angled outer surfaces of the base which define therebetween an angle in the range of 120 to 170 degrees; and the step of mounting comprises the steps of contacting the inner surface of the tire with the first angled surface at the first location and contacting the inner surface of the tire with the second angled surface at a second location circumferentially spaced from the first location.

16. The method of claim 1 further comprising the step of inserting a second magnet of the light assembly between the opposed sidewalls of the tire into the annular interior chamber; and wherein the step of mounting comprises the step of magnetically coupling the inserted second magnet to the embedded belt layer at a second location circumferentially spaced from the first location so that an outer surface of the first magnet is substantially flush against the inner surface of the tire at the first location and an outer surface of the second magnet is substantially flush against the inner surface of the tire at the second location.

17. The method of claim 1 further comprising the step of inserting a second magnet of the light assembly between the opposed sidewalls of the tire into the annular interior chamber; and wherein the step of mounting comprises the step of magnetically coupling the inserted second magnet to the embedded belt layer at a second location circumferentially spaced from the first location so that an outer surface of the first magnet faces and is substantially parallel to the inner surface of the tire at the first location and an outer surface of the second magnet faces and is substantially parallel to the inner surface of the tire at the second location.

18. The method of claim 17 wherein the outer surfaces of the first and second magnets define therebetween an angle in the range of 120 to 170 degrees when magnetically coupled respectively at the first and second locations.

19. The method of claim 1 wherein the step of mounting comprises the step of pivoting the first magnet relative to a base of the light assembly on which the first magnet is pivotally mounted.

20. A light assembly for use in inspecting the inside of a vehicle tire which comprises a tread wall with an embedded belt layer containing a ferrous metal and a pair of spaced sidewalls secured to and extending radially inwardly from the tread wall wherein the tread wall has a concavely curved inner surface which faces radially inwardly; the light assembly comprising:
 a base;
 a light source mounted on the base; and
 first and second magnets of the base which are spaced from one another and have respective outer surfaces configured to magnetically couple the base to the belt layer at first and second circumferentially spaced locations of the concavely curved inner surface.

* * * * *